US009709850B2

(12) United States Patent
Hsueh et al.

(10) Patent No.: US 9,709,850 B2
(45) Date of Patent: Jul. 18, 2017

(54) DOUBLE-LAYERED BACKLIGHT MODULE

(71) Applicant: AU OPTRONICS CORPORATION, Hsin-Chu (TW)

(72) Inventors: Wen-Lin Hsueh, Hsin-Chu (TW); Meng-Jia Hsiao, Hsin-Chu (TW); Chiung-Han Wang, Hsin-Chu (TW)

(73) Assignee: AU OPTRONICS CORPORATION, Hsin-Chu (TW)

( * ) Notice: Subject to any disclaimer, the term of this patent is extended or adjusted under 35 U.S.C. 154(b) by 88 days.

(21) Appl. No.: 14/802,122

(22) Filed: Jul. 17, 2015

(65) Prior Publication Data
US 2016/0076738 A1  Mar. 17, 2016

(30) Foreign Application Priority Data

Sep. 16, 2014  (TW) .............................. 103131927 A

(51) Int. Cl.
G09F 13/04 (2006.01)
G02F 1/1335 (2006.01)
G02F 1/1333 (2006.01)

(52) U.S. Cl.
CPC .. G02F 1/133606 (2013.01); G02F 1/133603 (2013.01); G02F 2001/133342 (2013.01)

(58) Field of Classification Search
CPC ........... G02F 1/133606; G02F 1/33603; G02F 2001/133342
USPC .............................. 362/97.1, 97.3, 97.4, 246
See application file for complete search history.

(56) References Cited

U.S. PATENT DOCUMENTS

| 7,549,760 B2 | 6/2009 | Jung et al. |
| 8,098,349 B2 | 1/2012 | Hung et al. |
| 2010/0171904 A1 | 7/2010 | Hung et al. |

FOREIGN PATENT DOCUMENTS

| TW | 200604658 | 2/2006 |
| TW | I285282 | 8/2007 |
| TW | 201027185 | 7/2010 |
| TW | I459078 | 11/2014 |

OTHER PUBLICATIONS

Office Action issued in corresponding application in Taiwan on Sep. 1, 2015.

*Primary Examiner* — Vip Patel
(74) *Attorney, Agent, or Firm* — McClure, Qualey & Rodack, LLP

(57) ABSTRACT

A double-layered backlight module includes a supporting plate having a supporting surface and a plurality of through holes formed thereon. A plurality of light sources is disposed on the supporting surface. A first optical modulation film is disposed at one side of the supporting plate where the plurality of light sources is located, and a first interlayer is formed between the first optical modulation film and the supporting surface. The first optical modulation film includes a first reflective surface formed at one side of the first optical modulation film facing the plurality of light sources and a plurality of first light exiting holes penetrating the first optical modulation film. A first diffusing plate is disposed at one side of the first optical modulation film opposite to the supporting plate. A second diffusing plate is disposed at one side of the supporting plate opposite to the supporting surface.

10 Claims, 12 Drawing Sheets

DOUBLE-LAYERED BACKLIGHT MODULE

BACKGROUND OF THE INVENTION

1. Field of the Invention

The present invention relates to a double-layered backlight module; particularly, the present invention relates to a double-layered backlight module, which has a supporting plate with the design of through holes.

2. Description of the Prior Art

With the development of the display techniques, many large sized and thin display devices are promoted. To increase the elasticity of space utilization of display devices, some display products are provided to meet this requirement, for example, display devices utilizing flexible technique or designed as double-layered display.

Taking double-layered display device for example, the traditional method utilized two display modules attached back-to-back. Please refer to the cross-sectional view of a traditional double-layered backlight module shown in FIG. 1. As shown in FIG. 1, the traditional double-layered backlight module 10 includes two bottom plates 12, 22 connected back-to-back. A plurality of light sources 14 are disposed on the bottom plate 12, and a diffusing plate 16 is disposed at a light emitting side of the bottom plate 12 (i.e. above the bottom plate 12). Similarly, a plurality of light sources 24 are disposed on the bottom plate 22, and a diffusing plate 26 is disposed at a light emitting side of the bottom plate 22 (i.e. under the bottom plate 12). However, the double-layered backlight module adopting aforementioned configuration has a larger thickness on the whole structure.

If a display device adopts edge type LEDs to produce the double-layered backlight module, although the space occupied by light sources will be slightly decreased, both sides of the edge type display device require a light guide plate, so that the whole thickness is not effectively improved. Besides, if light guide plates are disposed at both sides, the whole structure will be overweight, this is unfavorable for hanging up the display device. Therefore, the assembling methods adopted by the current display device need to be improved.

SUMMARY OF THE INVENTION

It is an object of the present invention to provide a double-layered backlight module for reducing size of a display device.

It is another object of the present invention to provide a double-layered backlight module for providing display light at two sides of the supporting plate.

The double-layered backlight module includes a supporting plate having a supporting surface and a plurality of through holes formed thereon. A plurality of light sources is disposed on the supporting surface. A first optical modulation film is disposed at one side of the supporting plate where the plurality of light sources is located, and a first interlayer is formed between the first optical modulation film and the supporting surface. The first optical modulation film includes a first reflective surface formed at one side of the first optical modulation film facing the plurality of light sources and a plurality of first light exiting holes penetrating the first optical modulation film. A first diffusing plate is disposed at one side of the first optical modulation film opposite to the supporting plate. A second diffusing plate is disposed at one side of the supporting plate opposite to the supporting surface. A part of light is reflected by the first reflective surface and the supporting surface in the first interlayer and arrives at the first diffusing plate via the plurality of first light exiting holes; another part of light is reflected by the first reflective surface and arrives at the second diffusing plate via the through holes. By the design of through holes, light sources disposed on the other side of the supporting plate (i.e. opposite to the supporting surface) can be left out to reduce the size of the backlight module.

DETAILED DESCRIPTION OF THE PREFERRED EMBODIMENT

The present invention provides a double-layered backlight module. Display panels can be disposed at two sides of the double-layered backlight module for displaying images. A plurality of through holes is formed on a supporting surface of the double-layered backlight module where light sources are located, so that light generated from the light sources can provide illumination at one side of the light emitting surface, and a part of light can be guided toward the opposite side of the light emitting surface via the through holes to provide illumination at the opposite side of the light emitting surface. The light source is preferably a light emitting diode, and the display panel is preferably a liquid crystal display panel, but it is not limited to.

Figure 1:
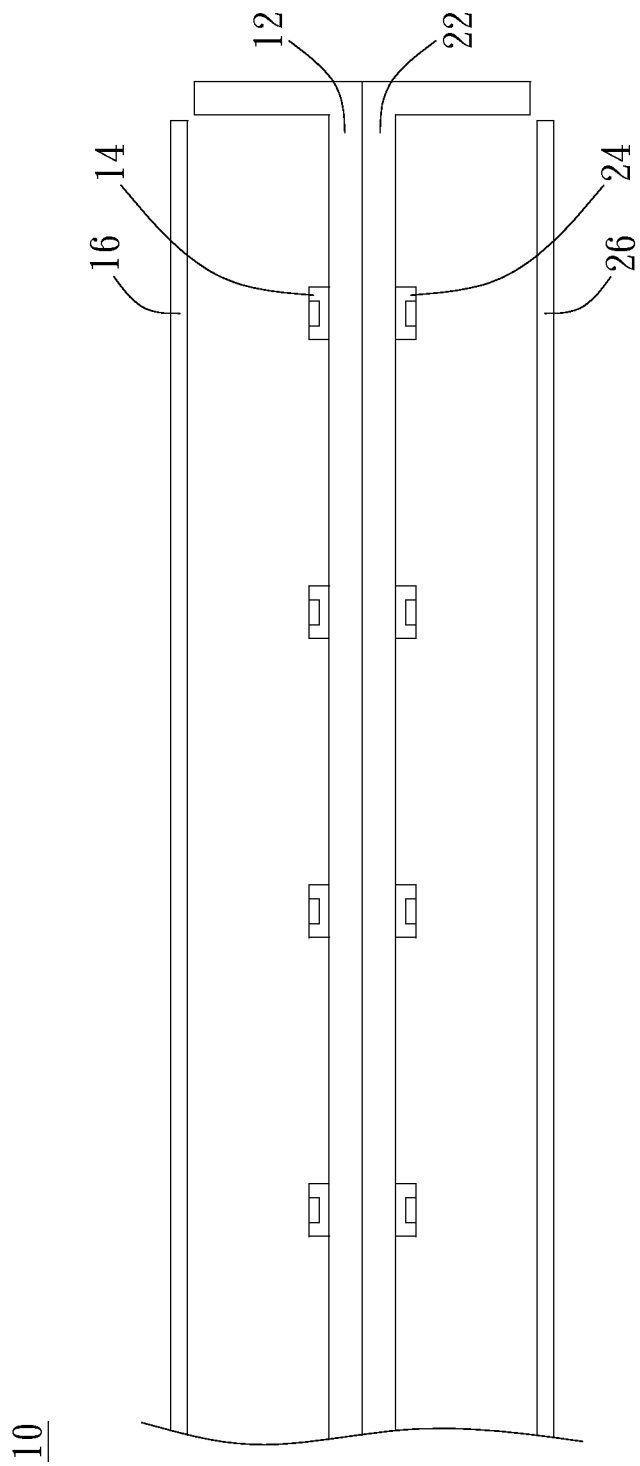
FIG. 1 is a cross-sectional view of a traditional double-layered backlight module.
Figure 2:
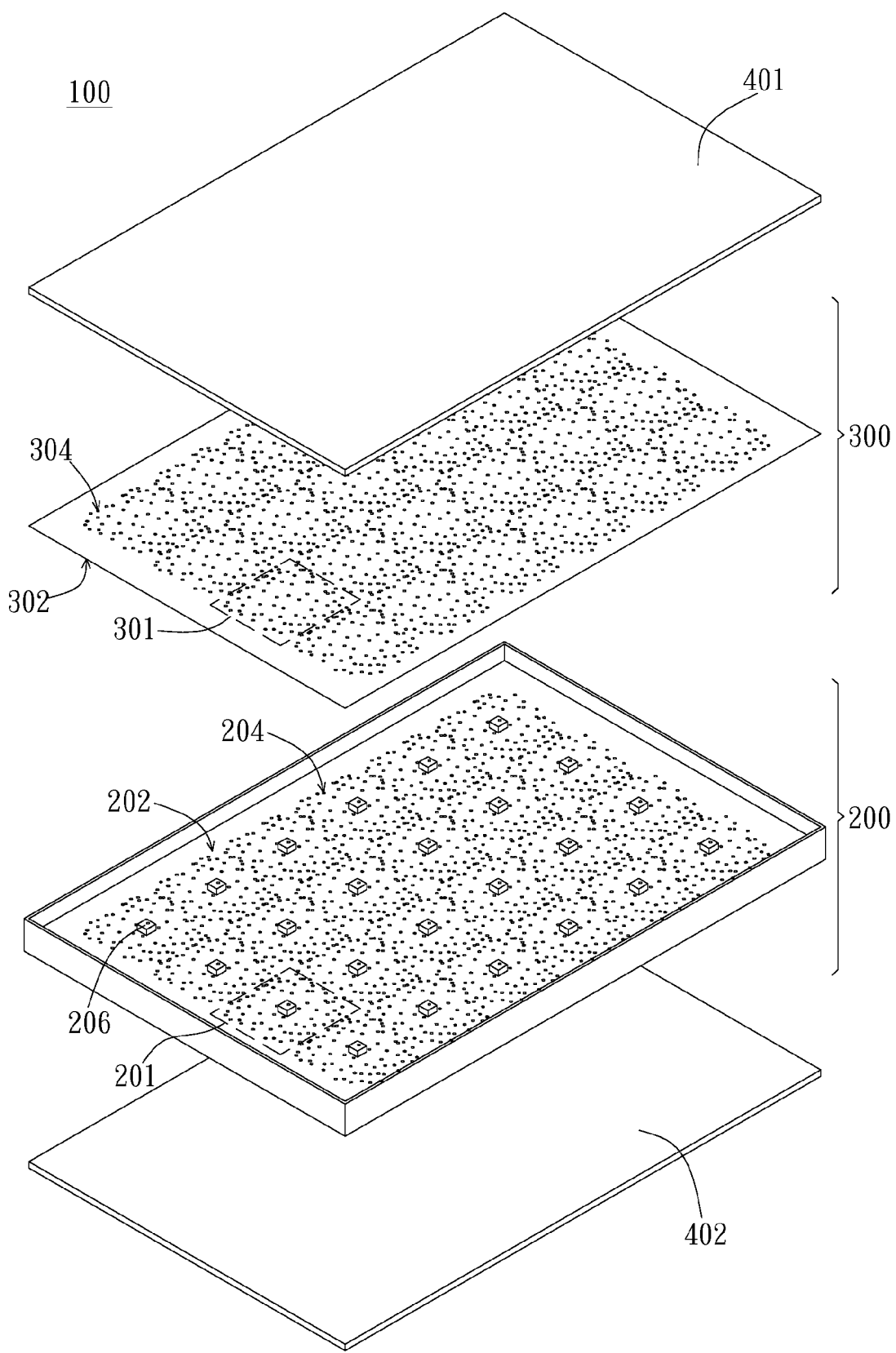
FIG. 2 is an exploded view of a double-layered backlight module of the present invention.

FIG. 2 is an exploded view of the double-layered backlight module 100 of the present invention. As shown in FIG. 2, the double-layered backlight module 100 includes a supporting plate 200, a plurality of light sources 206, a first optical modulation film 300, a first diffusing plate 401, and a second diffusing plate 402. The supporting plate 200 has a supporting surface 202. A plurality of through holes 204 is formed on the supporting surface 202, and the plurality of light sources 206 is disposed on the supporting surface 202. The supporting plate 200 is preferably made of metal material, such as an aluminum plate; however, in different embodiments, the supporting plate 200 may be made of plastic material, and a reflective material is coated on the surface of the supporting plate 200.

As shown in FIG. 2, the first optical modulation film 300 is disposed at one side of the supporting plate 200 where the plurality of light sources 206 is located, and located between the first diffusing plate 401 and the supporting plate 200. The first optical modulation film 300 includes a first reflective surface 302 and a plurality of first light exiting holes 304. The first reflective surface 302 is formed at one side of the first optical modulation film 300 facing the plurality of light sources 206. The plurality of first light exiting holes 304 penetrates the first optical modulation film 300. The first optical modulation film 300 is an optical film, which is made of, for example, a foam material. In addition to providing reflective light by the first reflective surface 302, the first optical modulation film 300 can distribute light emitted from the light sources 206 by the plurality of first light exiting holes 304. As shown in FIG. 2, the plurality of first light exiting holes 304 is preferably distributed to form multiple first blocks 301 and corresponding to different light sources 206. Light generated from light sources 206 can be reflected repeatedly (for example, there and back) between the first reflective surface 302 and the supporting surface 202, and then passes through first light exiting holes 304 of the first optical modulation film 300. In other words, light passing through the first optical modulation film 300 at different positions via first light exiting holes 304 can achieve effect of distributing light.

In addition, the first diffusing plate 401 is disposed on the first optical modulation film 300, i.e. the first diffusing plate 401 is disposed at one side of the first optical modulation film 300 opposite to the supporting plate 200. The second diffusing plate 402 is disposed at one side of the supporting plate 200 opposite to the supporting surface 202. When the light generated from light sources 206 passes through the first optical modulation film 300 via first light exiting holes 304, light can be further evened by the first diffusing plate 401, and conversely, when light reflected by the first optical modulation film 300 arrives at the second diffusing plate 402 after passing the through holes 204, light can be further evened by the second diffusing plate 402.

Figure 3A:
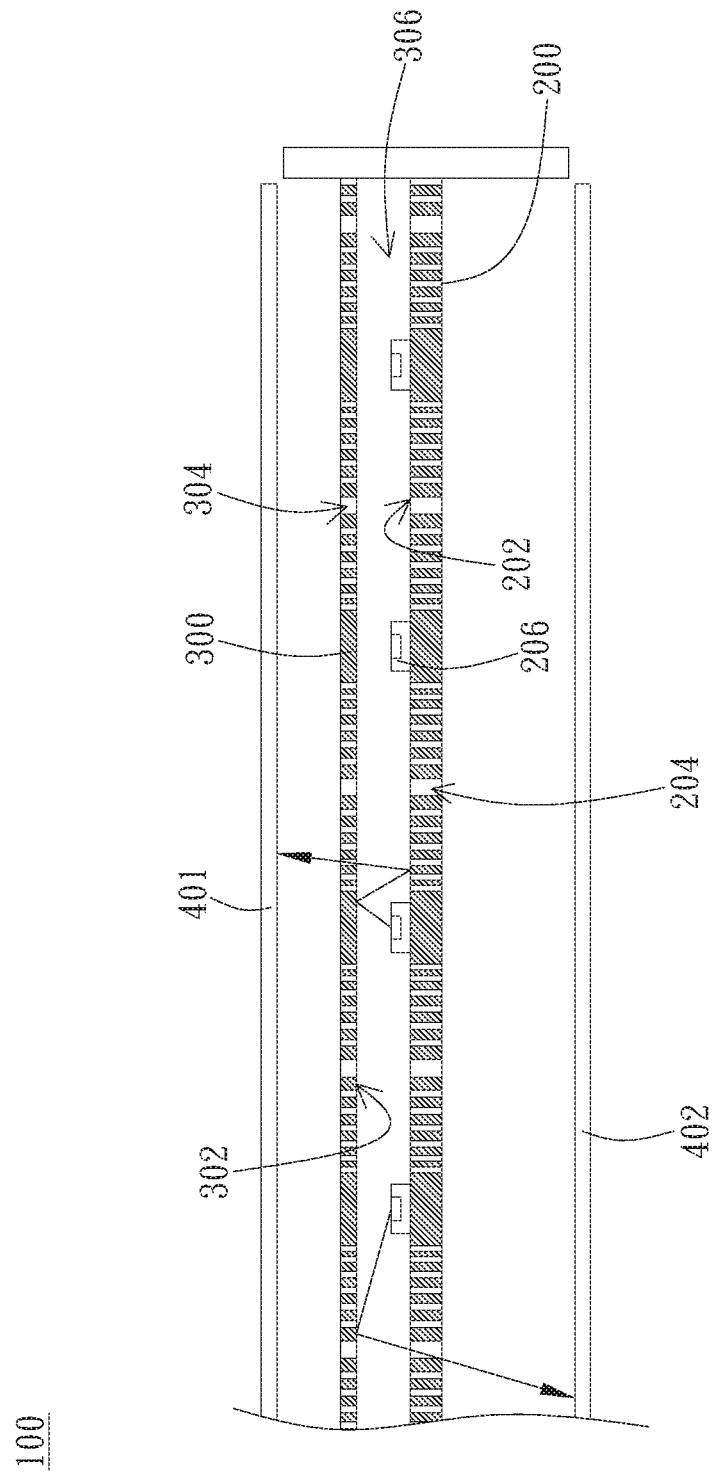
FIG. 3A is a cross-sectional view of an embodiment of the double-layered backlight module of the present invention.

Referring next to FIG. 3A, FIG. 3A is a cross-sectional view of an embodiment of the double-layered backlight module 100 of the present invention. As shown in FIG. 3A, a first interlayer 306 is formed between the first optical modulation film 300 and the supporting surface 202. The first interlayer 306 is preferably provided for light transmission. In other words, before light leaks out via first light exiting holes 304 or through holes 204, light will be reflected repeatedly in the first interlayer 306 between the supporting surface 202 and the first reflective surface 302 to be distributed over different areas. Besides, as shown in FIG. 3A, the plurality of first light exiting holes 304 is formed on the first optical modulation film 300, and the plurality of through holes 204 is formed on the supporting surface 202 of the supporting plate 200. As mentioned above, a part of light generated by the light sources 206 is reflected by the first reflective surface 302 and the supporting surface 202 in the first interlayer 306 and arrives at the first diffusing plate 401 via first light exiting holes 304; another part of light is reflected by the first reflective surface 302 and arrives at the second diffusing plate 402 via through holes 204.

Figure 3B:
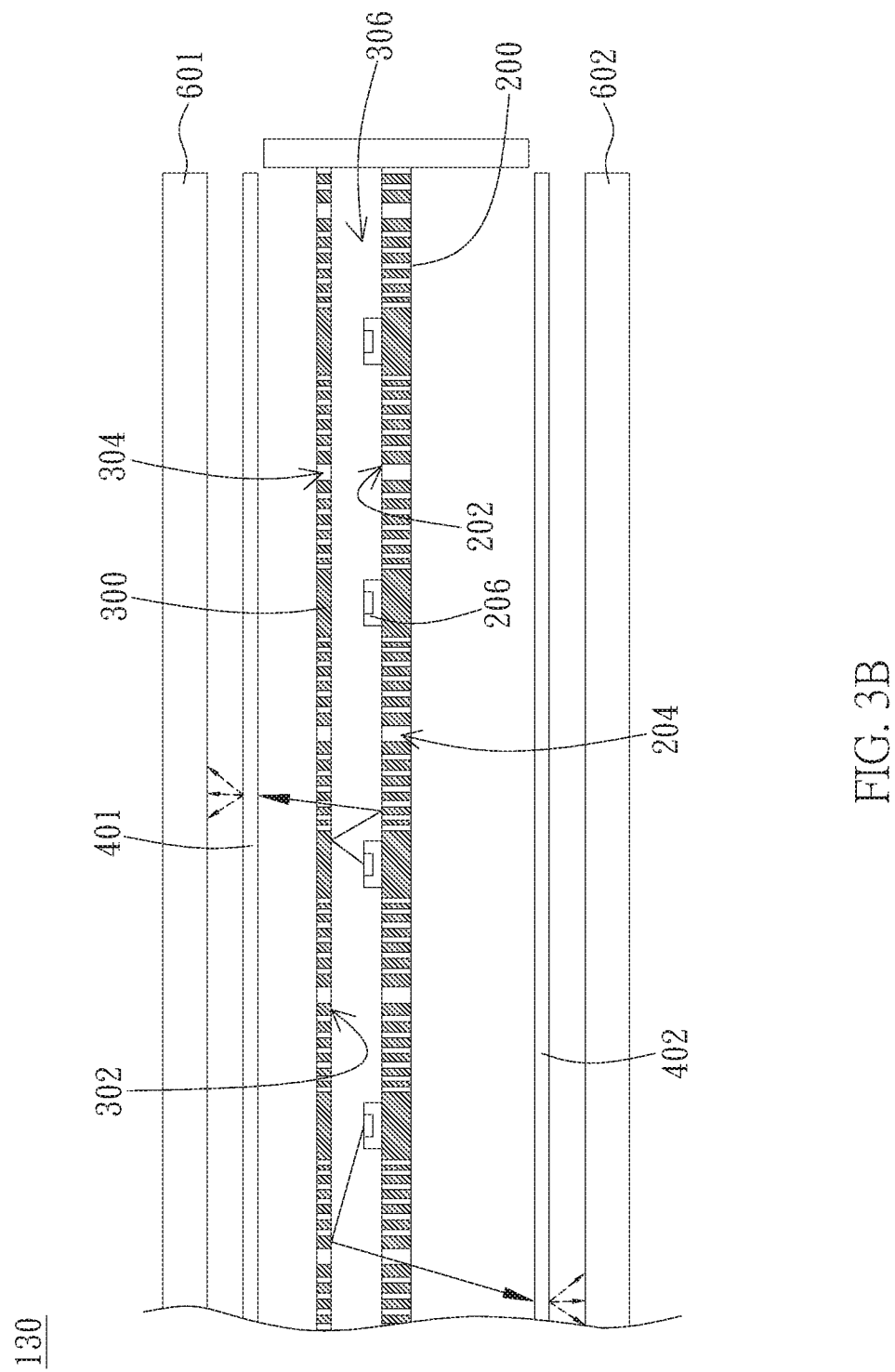
FIG. 3B is a cross-sectional view of an embodiment of a display device adopting the double-layered backlight module of the present invention.

Please further refer to FIG. 3B, which illustrates a display device 130 adopting the double-layered backlight module of the present invention. As shown in FIG. 3B, the display device 130 includes a first display panel 601 and a second display panel 602. The first display panel 601 is disposed at one side of the first diffusing plate 401 opposite to the first optical modulation film 300. The second display panel 602 is disposed at one side of the second diffusing plate 402 opposite to the supporting surface 202. Light leaving from first light exiting holes 304 and arriving at the diffusing plate 401 arrives at the first display panel 601, and light reflected by the first reflective surface 302 and passing through the through holes 204 and the second diffusing plate 402 arrives at the second display panel 602. In other words, the first display panel 601 obtains evenly distributed haze light by the first optical modulation film 300. The second display panel 602 obtains evenly distributed haze light by the supporting plate 200 having through holes. By this design, light sources on the supporting surface 202 may provide light for the first display panel 601 and the second display panel 602 via holes formed on the first optical modulation film 300 and the supporting plate 200 for achieving double-layered displaying effect. Compared to traditional methods, display devices adopting the double-layered backlight module of the present invention do not require two sets of backlight modules, and the thickness of the display device may become thinner to improve the whole structure and application elasticity.

Figure 4:
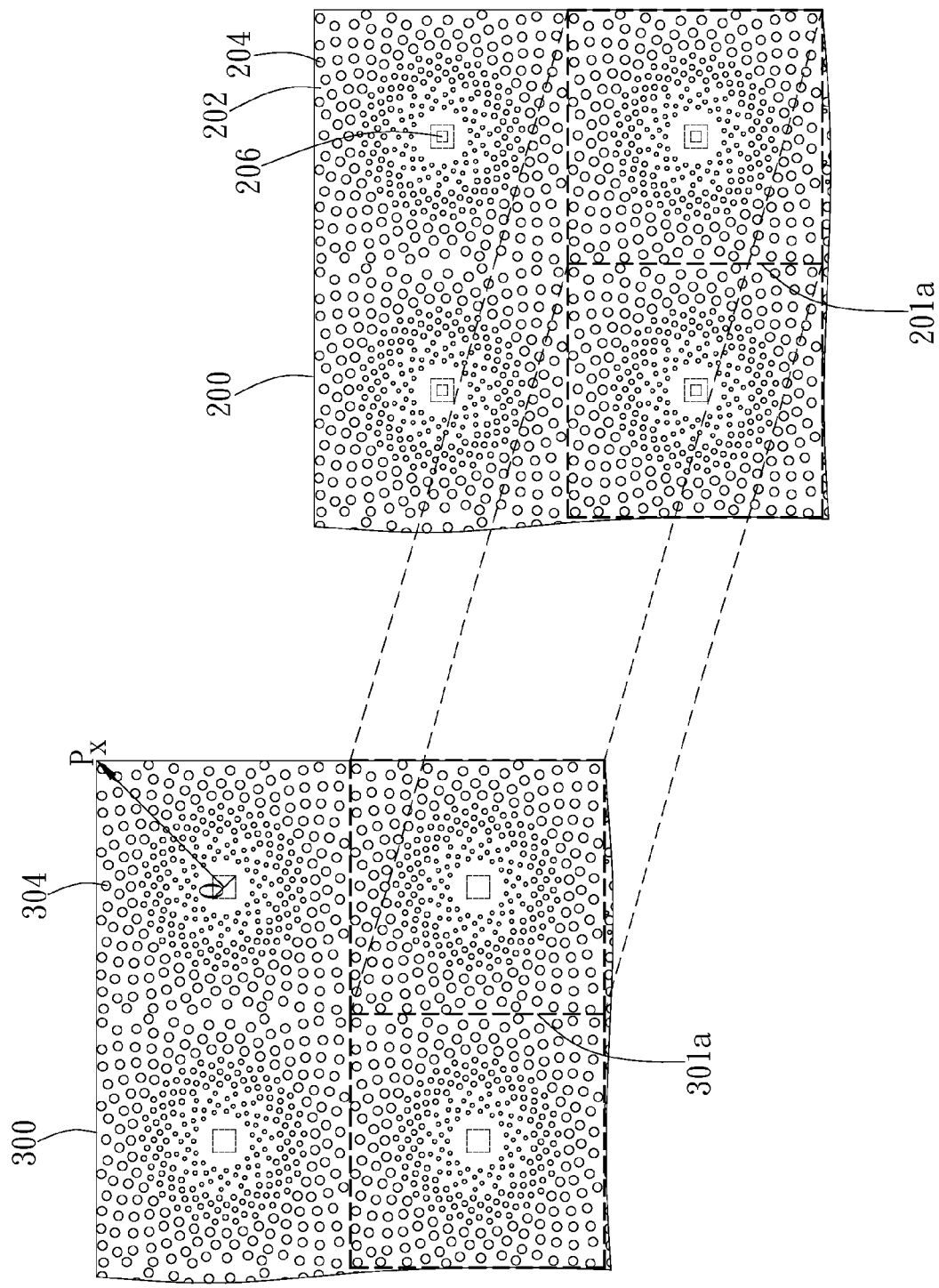
FIG. 4 is a schematic view of an embodiment of a first optical modulation film and a supporting plate.

Please refer to FIG. 3A and FIG. 4, the first optical modulation film 300 is disposed above the supporting plate 200. The first optical modulation film 300 has a plurality of first blocks corresponding to different light sources 206. As mentioned above, light generated from the light sources 206 passes through the first optical modulation film 300 via first light exiting holes 304. As such, the double-layered backlight module may change an aperture ratio per unit area at different positions to distribute light generated from the light sources 206 by adjusting the density and size of the plurality of first light exiting holes 304 formed on different positions of the first optical modulation film 300. Besides, the distribution of first light exiting holes 304 in each first block 301a is preferably the same, similar, or having relationship to a certain extent. Besides, the aperture ratio per unit area mentioned above means a ratio of areas occupied by the first light exiting holes 304 within a unit area. In other words, the aperture ratio per unit area is preferably a standardized ratio without unit.

Besides, as shown in FIG. 4, a plurality of transmission blocks is formed on the supporting surface 202 corresponding to the plurality of first blocks (for example, the transmission block 201a projectively corresponds to the first block 301a). As mentioned above, light reflected by the first optical modulation film 300 arrives at the second diffusing plate via through holes 204. As such, the double-layered backlight module may change an aperture ratio per unit area at different positions to distribute light reflected by the first optical modulation film 300 by adjusting the density and size of the plurality of through holes 204 formed on different positions of the supporting plate 200. Besides, the distribution of through holes 204 in each transmission block 201a is preferably the same, similar, or having relationship to a certain extent.

Specifically, the adjustment of the aforementioned aperture ratio per unit area in each first block 301 of the first optical modulation film 300 preferably adopts: the aperture ratio per unit area of the plurality of first light exiting holes in each first block increases progressively from the center of a projecting position of the closest light source toward an outer side of the first block. Similarly, the aperture ratio per unit area in each transmission block 201a of the supporting plate 200 preferably adopts: the aperture ratio per unit area of the plurality of through holes in each transmission block increases progressively from the center of the light source formed on the transmission block toward an outer side of the transmission block. In the embodiment shown in FIG. 4, the distribution of through holes 204 in the transmission block 201a preferably corresponds to the distribution of first light exiting holes 304 in the first block 301. In other words, through holes 204 and first light exiting holes 304 have the same aperture ratio at each corresponding position (projecting corresponding position) in an extension direction from the center of the light source toward the outer side.

Figure 5:
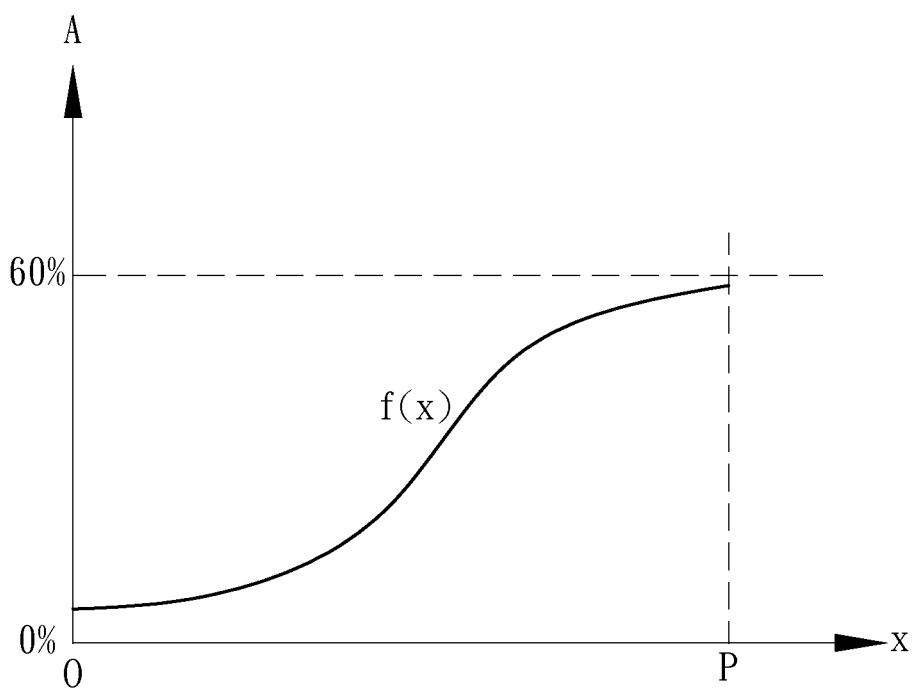
FIG. 5 is a schematic view of an aperture ratio per unit area of the plurality of first light exiting holes on the first optical modulation film.

Please refer to FIG. 4 and FIG. 5. FIG. 5 illustrates the aperture ratio per unit area of the plurality of first light exiting holes on the first optical modulation film. As shown in FIG. 5, the transverse axis represents a relative position (x) from the center of the projecting position of the light source in the first block. The longitudinal axis represents an aperture ratio per unit area (A) of the first optical modulation film. Different positions on the transverse axis will correspond to a specific aperture ratio per unit area based on a predetermined function. As shown in FIG. 5, in the first block, the aperture ratio per unit area of first light exiting holes increases progressively from the center (origin point (O)) of a projecting position of the light source toward the outer side of the first block based on function values of a predetermined first function. In other words, function values of the first function will increase progressively by the distance from the center of the projecting position of corresponding light source. The first function is preferably a cubic polynomial function such as:

$$f(x)=ax^3+bx^2+cx+d$$

wherein x represents the distance from a position to the projecting position of the light source in the first block 301, and f(x) may represent the aperture ratio per unit area of the position, or represent the aperture ratio per unit area of the position by multiplying a parameter. In a preferred embodiment of measuring the backlight distribution, coefficient (a) is a non-zero negative number, $b^2-3ac>0$, and a better light emitting effect may be obtained when the aperture ratio per unit area approaches 60% near a far end position (point P) from the light source. For example, when the first function is configured to (but is not limited to) $f_1(x)=-1.1078x^3+1.9775x^2-0.3242x+0.0328$, $f_2(x)=-0.6836x^3+1.0845x^2-0.1148x+0.0365$, or $f_3(x)=-0.84x^3+1.3913x^2-0.0308x+0.0239$, a better light emitting effect can be obtained.

On the other hand, through holes 204 formed on the supporting surface 202 may have a curve similar to the aforementioned first function. Specifically, in the transmission block 201a, the aperture ratio per unit area of through holes 204 is varied by the distance from the center of the supported light source 206 associated with function values of a second function. In other words, function values of the second function will increase progressively by the distance from the light source 206. The second function is preferably a cubic polynomial function such as:

$$g(x)=ax^3+bx^2+cx+d$$

wherein x represents the distance from a position to the light source in the transmission block 201, and g(x) may represent the aperture ratio per unit area of the position, or represent the aperture ratio per unit area of the position by multiplying a parameter. In a preferred embodiment of measuring the backlight distribution, coefficient (a) is a non-zero negative number, $b^2-3ac>0$, and a better light emitting effect may be obtained when the aperture ratio per unit area approaches 60% near a far end position (point P) from the light source. For the embodiment illustrated in FIG. 4, the variation of function values of the second function and that of the first function are the same since through holes 204 and the corresponding first light exiting holes 304 have the same aperture ratio in the extension direction from the center of the light source 206 toward the outer side. By this design, the backlight will be distributed much more evenly.

Figure 6A:
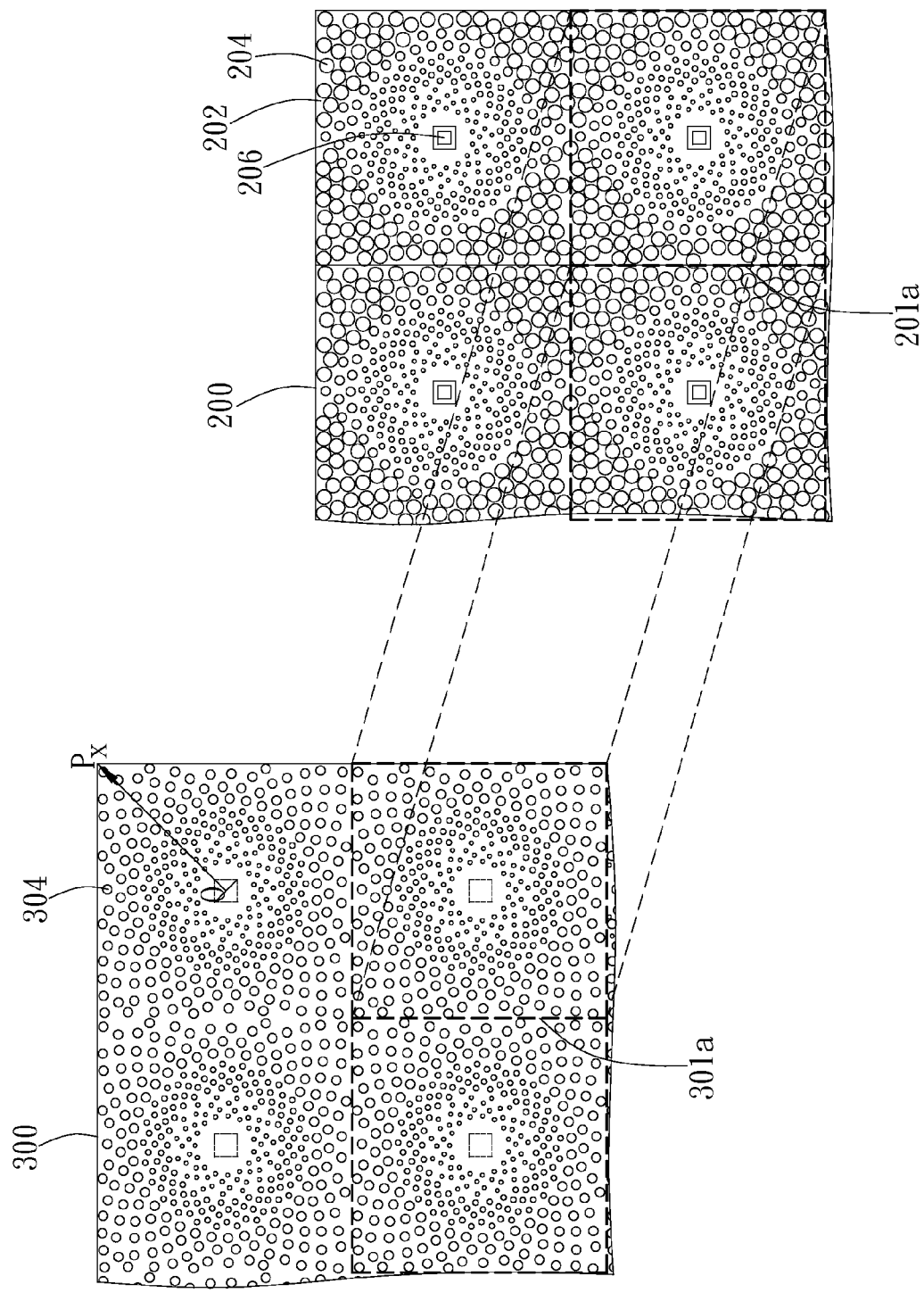
FIG. 6A is a schematic view of another embodiment of the first optical modulation film and the supporting plate.
Figure 6B:
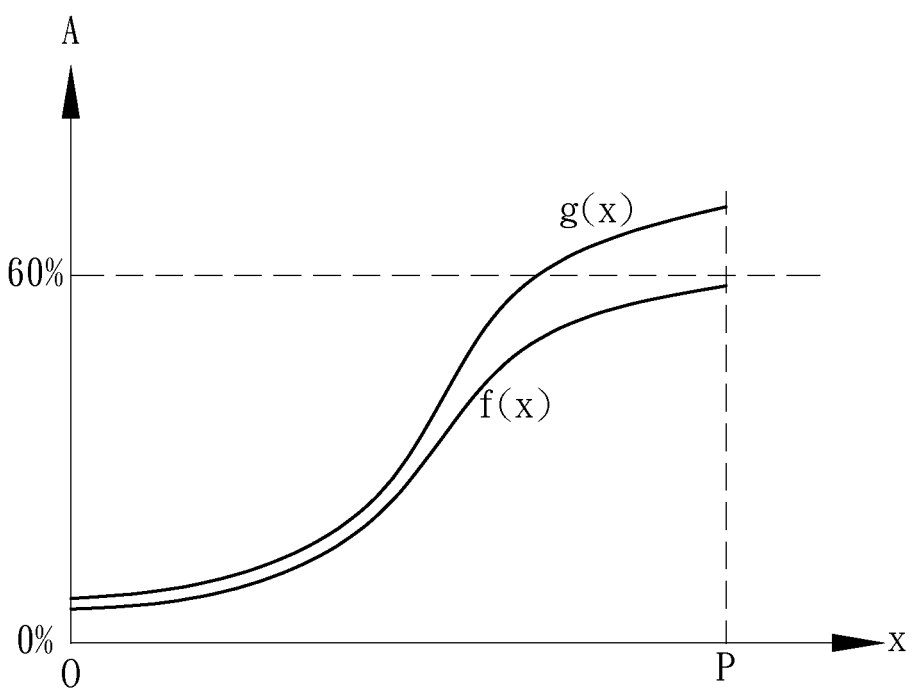
FIG. 6B is a schematic view of an aperture ratio per unit area corresponding to FIG. 6A.

In addition to the aforementioned content that first light exiting holes and through holes have the same distribution, other distributions may be adopted according to different requirements. For example, the total aperture area of the plurality of through holes in each transmission block is larger than the total aperture area of the plurality of first light exiting holes in each first block. As shown in FIG. 6A, the aperture ratio of through holes 204 of the supporting plate 200 at a periphery region apart from the light source 206 is larger than the aperture ratio of first light exiting holes 304 at the corresponding position (i.e. at the periphery region of each first block), so that the total aperture area of the transmission block 201a is larger than the total aperture area of the first block 301a. Please refer to FIG. 6B, for the variation of function values, the aperture ratio of the second function g(x) is larger than that of the first function f(x) at the position apart from the light source (at the position near point P shown in FIG. 6B). For example, in a case that brightness of displaying light passing through the supporting plate 200 toward the back side of the supporting plate 200 is insufficient at the periphery region apart from the light source, the amount of emitted light passing through the supporting plate 200 toward the back side of the supporting plate 200 can be increased by adopting distribution shown in FIG. 6A to elevate uniformity of emitted light. By this design, in each transmission block 201a, the amount of emitted light will be effectively increased to elevate uniformity of emitted light at the periphery region where dark bands may occur.

Figure 7A:
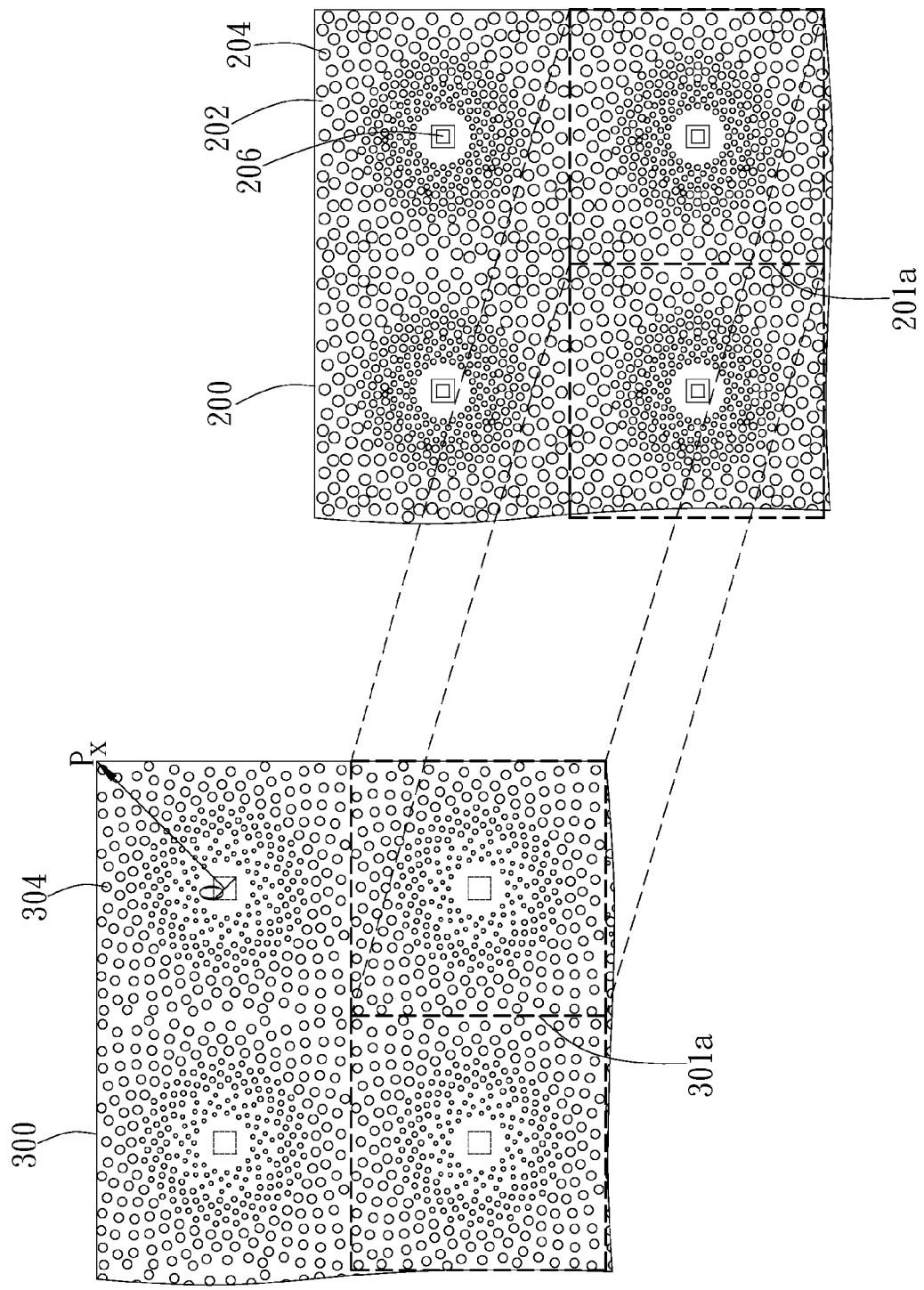
FIG. 7A is a schematic view of another embodiment of the first optical modulation film and the supporting plate.
Figure 7B:
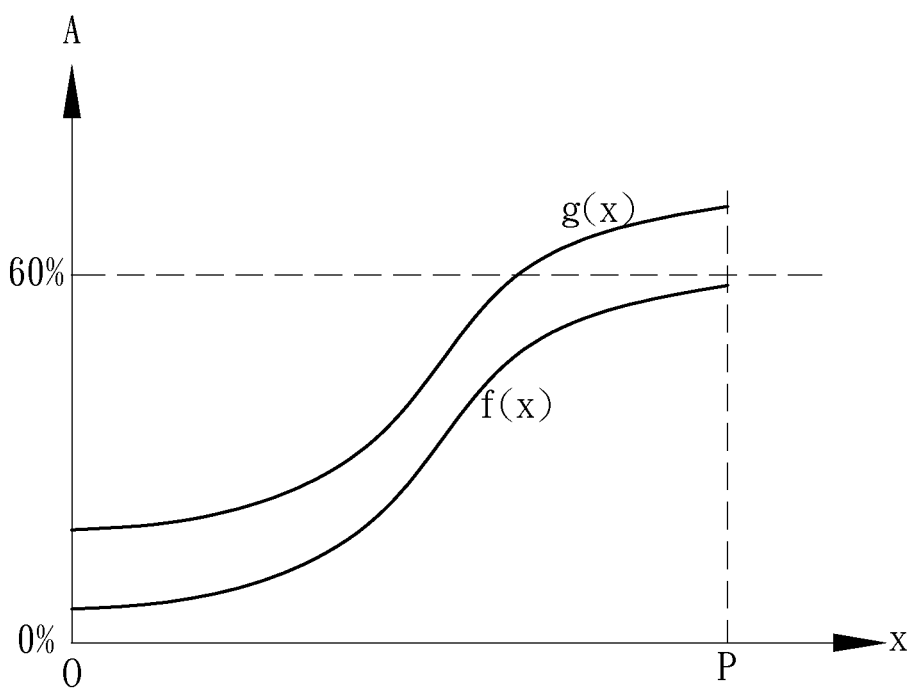
FIG. 7B is a schematic view of an aperture ratio per unit area corresponding to FIG. 7A.

FIG. 7A is a schematic view of another embodiment of the first optical modulation film 300 and the supporting plate 200. FIG. 7A illustrates another distribution of first light exiting holes 304 and through holes 204 that adopts: the aperture ratio per unit area of the plurality of through holes 204 in each transmission block 201a is larger than the aperture ratio per unit area of the plurality of first light exiting holes 304 within a projecting position of each first block 301a. In other words, the difference between the embodiment illustrated in FIG. 7A and the embodiment illustrated in FIG. 6A is that the supporting surface 202 has a larger aperture ratio per unit area not only at the periphery region apart from the light source, but also at other corresponding positions. Please refer to FIG. 7B, for the variation of function values, the aperture ratio of the second function g(x) is larger than that of the first function f(x) at each corresponding position (i.e. from point O to point P). The amount of emitted light passing through the supporting plate 200 toward the back side of the supporting plate 200 can be increased by adopting distribution shown in FIG. 7A to elevate the uniformity of emitted light. In contrast, the brightness of backlight at the back side of the supporting plate may be decreased, if necessary, to have a certain difference from brightness of the front side (opposite to the back side of the supporting plate) by controlling the aperture ratio per unit area of the supporting surface based on the same concept mentioned above.

Figure 8:
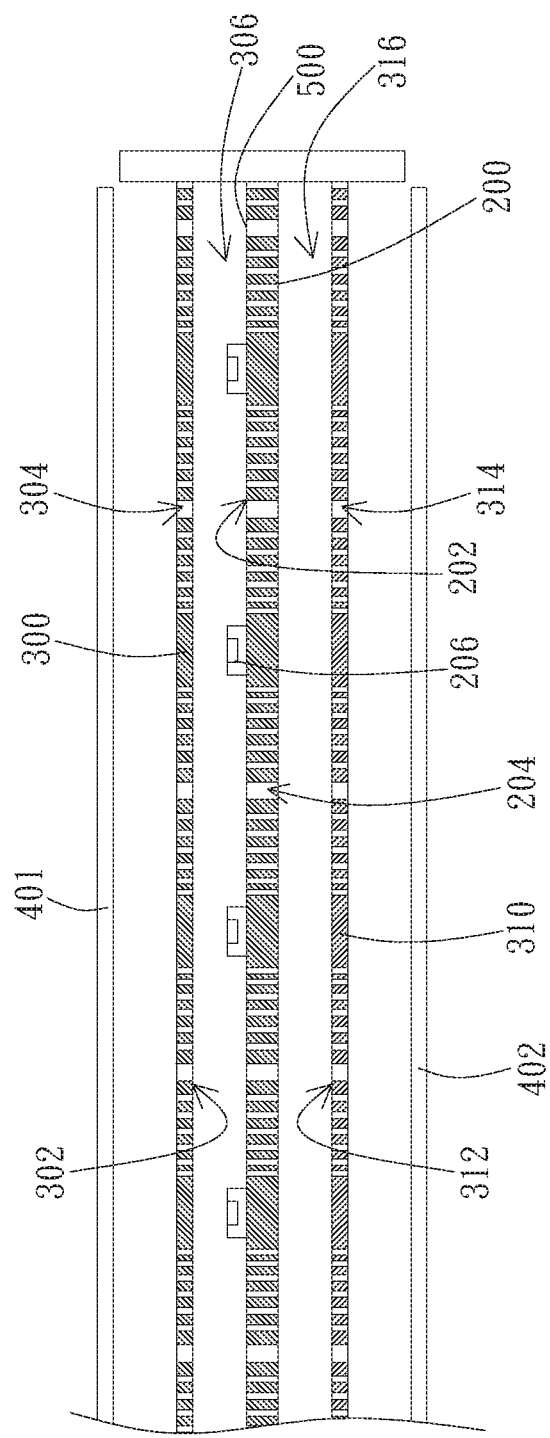
FIGS. 8 and 9 are schematic views of different embodiments of the double-layered backlight module of the present invention.

FIG. 8 is a schematic view of another embodiment of the double-layered backlight module of the present invention. As shown in FIG. 8, in addition to the structure shown in FIG. 3A, a second optical modulation film 310 is disposed between the supporting plate 200 and the second diffusing plate 402. Similarly, the second modulation film 310 includes a second reflective surface 312 formed at one side of the second optical modulation film 310 facing the supporting plate 200 and includes a plurality of second light exiting holes 314 penetrating the second optical modulation film 310. Besides, a second interlayer 316 is formed between the second optical modulation film 310 and a rear surface of the supporting plate 200. The second interlayer 316 is preferably provided for light transmission. In other words, before light leaks out via the second light exiting holes 314 or the through holes 204, light will be reflected repeatedly in the second interlayer 316 between the rear surface of the supporting plate 200 and the second reflective surface 312 for distributing over different areas. With the plurality of through holes 204 formed on the supporting surface 202 of the supporting plate 200, when light generated from light sources 206 passes through the plurality of through holes 204 and enters the second interlayer 316 from the first inter layer 306, light arrives at the second diffusing plate 402 via the plurality of second light exiting holes 314 after being reflected by the second reflective surface 312 and the rear surface of the supporting plate 200 in the second interlayer 316. For example, in a case that light in the second interlayer 316 has a higher brightness, or light in the second interlayer 316 are not evenly distributed, the uniformity of emitted light can be elevated by utilizing the second optical modulation film 310 to redistribute light. Besides, by the parallel arrangement of the first interlayer 306 and the second interlayer 316, light in two interlayers may be further mixed via through holes 204 to allow light in each interlayer to have a much more evenly distribution.

Figure 9:
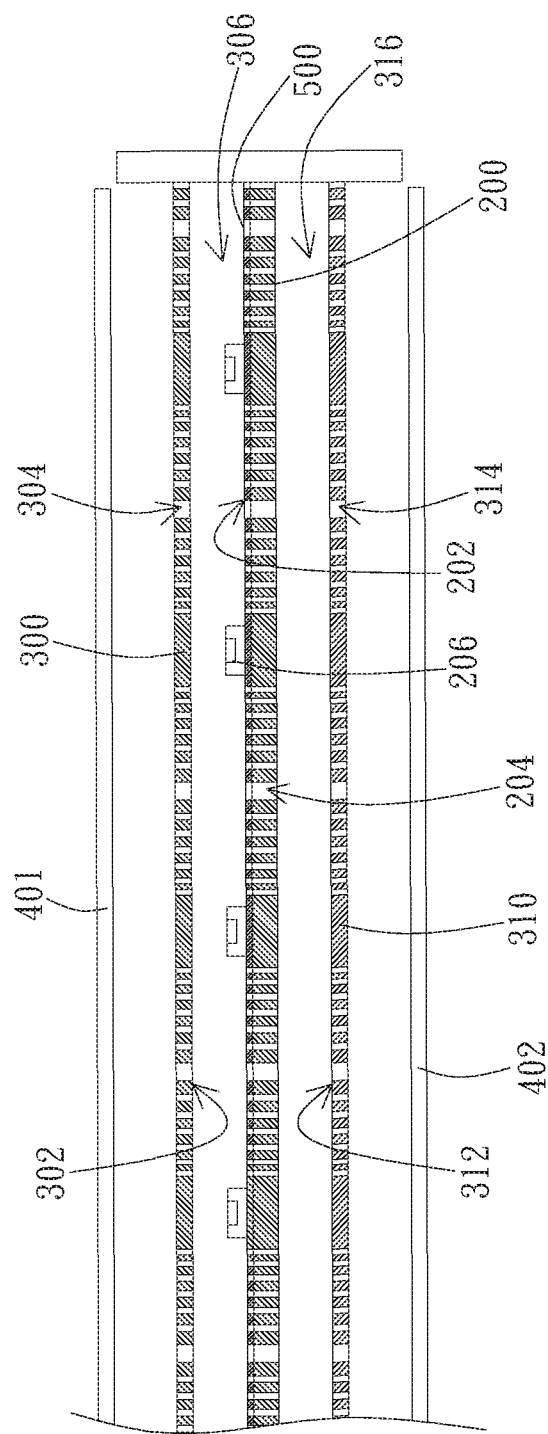

As mentioned above, since the supporting plate may be made of metal material that can reflect light, the supporting surface is preferably formed by the surface of the supporting plate. However, if the reflectivity of the supporting plate is not high enough, other reflective material can be disposed on the surface of the supporting plate to elevate reflectivity. As shown in FIG. 9, a reflective film 500 is formed at a surface of the supporting plate 200 where light sources are disposed. The reflectivity of the reflective film 500 is higher than the reflectivity of the surface of the supporting plate 200. A plurality of holes is formed to correspond to the position of the plurality of through holes 204. Said holes can be formed, for example, together with through holes 204 after the reflective film 500 is attached to the supporting plate 200 to provide light passing therethrough. By this disposition, the amount of emitted light passing through the first interlayer 306 and arriving at the first diffusing plate 401 can be increased. In other embodiments, the reflective film can be attached to the front surface and the rear surface of the supporting plate for increasing the amount of emitted light passing through the first interlayer toward the first diffusing plate and increasing the amount of emitted light passing through the second interlayer toward the second diffusing plate.

In conclusion, the double-layered backlight module of the present invention may utilize through hole design to direct light reflected back to the supporting plate toward the other side of the supporting plate for achieving double-layered displaying effect. Besides, utilizing optical modulation film having the plurality of light exiting holes and combining light reflection effect with light uniformity effect, light distribution is much more evenly. In addition, utilizing through hole design on the supporting plate, light sources disposed on the other side of the supporting plate can be left out to reduce the size of the backlight module.

Although the preferred embodiments of the present invention have been described herein, the above description is merely illustrative. Further modification of the invention herein disclosed will occur to those skilled in the respective arts and all such modifications are deemed to be within the scope of the invention as defined by the appended claims.

What is claimed is:

1. A double-layered backlight module comprising:
   a supporting plate having a supporting surface and a plurality of through holes formed on the supporting surface;
   a plurality of light sources disposed on the supporting surface;
   a first optical modulation film disposed at one side of the supporting plate where the plurality of light sources is located, a first interlayer formed between the first optical modulation film and the supporting surface, wherein the first optical modulation film comprises:
   a first reflective surface formed at one side of the first optical modulation film facing the plurality of light sources; and
   a plurality of first light exiting holes penetrating the first optical modulation film;
   a first diffusing plate disposed at one side of the first optical modulation film opposite to the supporting plate; and
   a second diffusing plate disposed at one side of the supporting plate opposite to the supporting surface,
   wherein a part of light generated from the plurality of light sources is reflected by the first reflective surface and the supporting surface in the first interlayer and arrives at the first diffusing plate via the plurality of first light exiting holes; another part of light is reflected by the first reflective surface and arrives at the second diffusing plate via the plurality of through holes.

2. The double-layered backlight module of claim 1, wherein the first optical modulation film has a plurality of first blocks corresponding to the plurality of light sources; an aperture ratio per unit area of the plurality of first light exiting holes in each first block increases progressively from the center of a projecting position of the most approaching light source toward an outer side of the first block.

3. The double-layered backlight module of claim 2, wherein in each first block, the aperture ratio per unit area of the plurality of first light exiting holes is varied by the distance from the center of the projecting position of corresponding light source associated with function values of a first function; the first function is a cubic polynomial function.

4. The double-layered backlight module of claim 2, wherein a plurality of transmission blocks is formed on the supporting surface corresponding to the plurality of first blocks; an aperture ratio per unit area of the plurality of through holes in each transmission block increases progressively from the center of the light source formed on the transmission block toward an outer side of the transmission block.

5. The double-layered backlight module of claim 4, wherein in each transmission block, the aperture ratio per unit area of the plurality of through holes is varied by the distance from the center of the supported light source associated with function values of a second function; the second function is a cubic polynomial function.

6. The double-layered backlight module of claim 4, wherein the distribution of the plurality of through holes in each transmission block corresponds to the distribution of the plurality of first light exiting holes in each first block.

7. The double-layered backlight module of claim 4, wherein the total aperture area of the plurality of through holes in each transmission block is larger than the total aperture area of the plurality of first light exiting holes in each first block.

8. The double-layered backlight module of claim 7, wherein the aperture ratio per unit area of the plurality of through holes in each transmission block is larger than the aperture ratio per unit area of the plurality of first light exiting holes within a projecting position of each first block.

9. The double-layered backlight module of claim 1, further comprising a second optical modulation film disposed between the supporting plate and the second diffusing plate, a second interlayer formed between the second optical modulation film and a rear surface of the supporting plate, wherein the second modulation film comprises:

a second reflective surface formed at one side of the second optical modulation film facing the supporting plate; and a plurality of second light exiting holes penetrating the second optical modulation film, wherein a part of light generated from the plurality of light sources passes through the plurality of through holes and enters the second interlayer, and arrives at the second diffusing plate via the plurality of second light exiting holes after being reflected by the second reflective surface and the rear surface of the supporting plate in the second interlayer.

10. A display device comprising:

the double-layered backlight module mentioned in one of claim 1;

a first display panel disposed at one side of the first diffusing plate opposite to the first optical modulation film; and a second display panel disposed at one side of the second diffusing plate opposite to the supporting surface.

* * * * *